United States Patent
Choi et al.

(10) Patent No.: US 7,409,000 B2
(45) Date of Patent: Aug. 5, 2008

(54) DATA TRANSMISSION/RECEPTION APPARATUS AND METHOD FOR IMPROVING PERFORMANCE IN A MOBILE COMMUNICATION SYSTEM USING SPACE-TIME TRELLIS CODE

(75) Inventors: Eoi-Young Choi, Seoul (KR);
Seung-Bum Suh, Seoul (KR);
Jun-Hong Hui, Yongin-si (KR); Ying Li, University Xi'an (CN)

(73) Assignee: Samsung Electronics Co., Ltd. (KR)

( * ) Notice: Subject to any disclaimer, the term of this patent is extended or adjusted under 35 U.S.C. 154(b) by 677 days.

(21) Appl. No.: 11/002,405

(22) Filed: Dec. 2, 2004

(65) Prior Publication Data

US 2005/0141632 A1    Jun. 30, 2005

(30) Foreign Application Priority Data

Dec. 3, 2003    (KR)    ...... 10-2003-0087277

(51) Int. Cl.
*H04L 23/02*    (2006.01)
(52) U.S. Cl. .................. 375/265; 714/755
(58) Field of Classification Search .......... 375/262, 375/265, 267, 299; 714/752, 755
See application file for complete search history.

(56) References Cited

U.S. PATENT DOCUMENTS

| | | | | |
|---|---|---|---|---|
| 6,298,461 B1 * | 10/2001 | Tong et al. | ............. | 714/755 |
| 6,954,885 B2 * | 10/2005 | Hurt et al. | ............. | 714/701 |
| 6,987,543 B1 * | 1/2006 | Mogre et al. | ............. | 348/608 |
| 6,996,133 B2 * | 2/2006 | Bretl et al. | ............. | 370/535 |

FOREIGN PATENT DOCUMENTS

| | | |
|---|---|---|
| WO | WO 02/43313 | 5/2002 |
| WO | WO 02/43314 | 5/2002 |

OTHER PUBLICATIONS

Vahid Tarokh, Nambi Seshadri, A.R. Calderbank; "Space-Time Codes for High Data Rate Wireless Communication: Performance Criterion and Code Construction"; IEEE Transactions on Information Theory, vol. 44, No. 2, Mar. 1998; pp. 744-765.
Vivek Gulati et al., Concatenated Codes for Fading Channels Based on Recursive Space-Time Trellis Codes, IEEE Transactions on Wireless Communcations, vol. 2, No. 1, Jan. 2003, pp. 118-128.

(Continued)

*Primary Examiner*—Khanh C Tran
(74) *Attorney, Agent, or Firm*—The Farrell Law Firm, PC

(57) ABSTRACT

Disclosed is a space-time trellis code (STTC) encoding method for performing space-time coding of a serially-concatenated space-time code (SC-STC) in an encoder having an outer encoder for performing channel coding and an inner encoder for performing the space-time coding, in a mobile communication system including one or more transmission antennas, by transmitting via a first transmission antenna a symbol generated by encoding a first input signal output from the outer encoder by a first recursive convolutional encoder and a symbol generated by encoding a second input signal output from the outer encoder by a second recursive convolutional encoder; and transmitting via a second transmission antenna the first and second input signals.

35 Claims, 9 Drawing Sheets

OTHER PUBLICATIONS

Dongzhe Cui et al., Performance of Parallel Concatenated Space-Time Codes, IEEE Communications Letters, vol. 5, No. 6, Jun. 2001, pp. 236-238.

Xiaotong Lin et al., Improved Space-Time Codes Using Serial Concatenation, IEEE Communications Letters, vol. 4, No. 7, Jul. 2000.

* cited by examiner

DATA TRANSMISSION/RECEPTION APPARATUS AND METHOD FOR IMPROVING PERFORMANCE IN A MOBILE COMMUNICATION SYSTEM USING SPACE-TIME TRELLIS CODE

PRIORITY

This application claims priority under 35 U.S.C. § 119 to an application entitled "Data Transmission/Reception Apparatus and Method for Performance Improvement in a Mobile Communication System Using Space-Time Trellis Code" filed in the Korean Intellectual Property Office on Dec. 3, 2003 and assigned Serial No. 2003-87277, the contents of which are incorporated herein by reference.

BACKGROUND OF THE INVENTION

1. Field of the Invention

The present invention relates generally to a mobile communication system, and in particular, to a data transmission/reception apparatus and method for improving performance in a mobile communication system using a space-time trellis code (STTC).

2. Description of the Related Art

With the rapid progress of mobile communication systems and the increasing amount of data being serviced in the mobile communication systems, $3^{rd}$ generation (3G) mobile communication systems for transmitting data at a high rate have been developed. Such 3G mobile communication system adopt asynchronous Wideband-Code Division Multiple Access (W-CDMA) technology in Europe and synchronous Code Division Multiple Access-2000 (CDMA-2000) technology in North America as radio access standards. Commonly, in the mobile communication systems, mobile stations (MSs) communicate with each other via a base station (BS).

However, in the existing mobile communication systems, during high-speed data transmission, a received signal undergoes phase distortion due to a natural fading phenomenon occurring on a radio channel. The fading reduces the amplitude of a received signal by several dB up to several tens of dB. This fading also distorts the phase of a received signal, and if not compensated for during data demodulation, causes information errors in the data transmitted by a transmission side, which in turn causing a deterioration in the quality of a mobile communication service. In order to transmit high-rate data without deterioration of the service quality, the mobile communication system must overcome the fading, and in order to overcome the fading, several diversity technologies are used.

A CDMA system utilizes a Rake receiver that performs diversity reception using a delay spread of a channel. Although the Rake receiver employs reception diversity for receiving a multipath signal, a Rake receiver employing diversity technology using the delay spread does not work when the delay spread is less than a predetermined value. In a Doppler spread channel, time diversity technology using interleaving and coding is used to compensate for fading, but the time diversity technology is not efficient in a low-speed Doppler spread channel.

In order to cope with the fading, space diversity technology is used in a channel with a low delay spread such as an indoor channel, and a channel with a low Doppler spread such as a pedestrian channel. The space diversity uses two or more transmission and reception antennas. That is, when a signal transmitted via one transmission antenna decreases in amplitude due to fading, the space diversity technology receives a signal transmitted via the other transmission antenna. The space diversity can be classified into reception antenna diversity technology using reception antennas and transmission diversity technology using transmission antennas. However, because the reception antenna diversity technology is applied to a mobile station, it is difficult to install a plurality of reception antennas the mobile station in light of its small size and increased installation expenses. It is recommendable to use the transmission diversity technology that installs a plurality of transmission antennas in a base station.

Particularly, a $4^{th}$ generation (4G) mobile communication system anticipates a data transfer rate of 10 Mbps to 150 Mbps, and requires a bit error rate (BER) of $10^{-3}$ for voice and a BER of $10^{-6}$ for data. The STTC is combination of multiple antennas and channel coding technology, and is a technology that contributes to remarkable improvement in a data rate and reliability in a radio multi-input/multi-output (MIMO) channel. The STTC can obtain space-time diversity gain by extending the space-time dimension of a transmission signal from a transmitter. In addition, the STTC can obtain coding gain without additional bandwidth, contributing to great improvement in channel capacity.

It is preferable to use the STTC when applying the transmission diversity technology, and when a plurality of transmission antennas are used, the use of the STTC obtains coding gain by amplifying transmission power, together with diversity gain corresponding to a reduction in channel gain occurring due to a fading channel.

A method for transmitting a signal using the STTC is disclosed in a reference entitled "Space Time Codes For High Data Rate Wireless Communication: Performance Criterion And Code Construction", by Vahid Tarokh, N. Seshadri, and A. Calderbank, IEEE Trans. on Info. Theory, pp. 744-765, Vol. 44, No. 2, March 1998, the contents of which are incorporated herein by reference.

With reference to FIG. 1, a description will now be made of a structure of a transmitter using a serially-concatenated space-time code encoding apparatus.

FIG. 1 is a block diagram illustrating a structure of a transmitter using a serially-concatenated space-time code encoding apparatus. Referring to FIG. 1, a serially-concatenated space-time code (SC-STC) encoding apparatus has a serial concatenation structure in which an interleaver 110 is interposed between an outer encoder 100 and an inner encoder 120. That is, the SC-STC encoding apparatus has two encoders serially concatenated with an interleaver interposed therebetween.

The outer encoder 100 is a general channel encoder, for which, for example, a convolutional encoder, a turbo encoder, and a low density parity check (LDPC) encoder can be used. Because the channel encoder is not related to the present invention, a detailed description thereof will be omitted. Although a variety of interleavers can be used for the interleaver 110, it will be assumed herein that a random interleaver is used, for the convenience of explanation.

The inner encoder 120 uses the STTC code in order to obtain a space-time diversity effect in a multi-antenna system. Therefore, a transmission data sequence 'u' is channel-encoded through the outer encoder 100, and an encoded sequence 'a' interleaved through the interleaver 110 is output as symbols $s_1$ and $s_2$ through the inner encoder 120, or an STTC encoder. The output symbol $s_1$ is transmitted via a first transmission antenna TX1, and the output symbol $s_2$ is transmitted via a second transmission antenna TX2.

Generally, a recursive STTC (R-STTC) encoder for delaying, feeding back output data, and calculating the output data with a next signal is used as the STTC encoder 120.

A structure of the R-STTC encoder will now be described in detail with reference to FIG. 2.

FIG. 2 is a block diagram illustrating a structure of a conventional quadrature phase shift keying (QPSK) modulation-based R-STTC encoder used as an inner encoder.

Referring to FIG. 2, the QPSK modulation-based R-STTC encoder has a structure in which two recursive convolutional codes are connected in parallel, and is comprised of, for example, two binary adders 201 and 205 and two delays 203 and 207. The R-STTC encoder illustrated in FIG. 2 outputs 4 STTC-encoded symbols $S_{11}$, $S_{21}$, $S_{12}$ and $S_{22}$ for 2 channel-encoded input bits $a_1$ and $a_2$ by QPSK modulation. The R-STTC encoder has a structure comprised of two recursive convolutional codes. The number of the recursive convolutional codes can be increased according to a change in a modulation method. The number of the binary adders and delays can also be changed depending on how the recursive convolutional codes are formed. For example, an 8-ary phase shift keying (8PSK) modulation-based R-STTC encoder is comprised of 3 binary adders and 3 delays, and a description thereof will be made with reference to FIG. 3. In the same manner, the R-STTC encoder can also be implemented based on 16-ary quadrature amplitude modulation (16QAM), 64QAM, and 128QAM.

The QPSK modulation-based R-STTC encoder illustrated in FIG. 2 outputs 4 STTC-encoded symbols through recursive convolutional encoders 200 and 210 in order to transmit channel-encoded input signals $a_1$ and $a_2$ via a first transmission antenna TX1 and a second transmission antenna TX2 while obtaining a space-time diversity effect. Here, each of the recursive convolutional encoders is an encoder for generating compound codes with a code rate of ½, and performs QPSK modulation so that the two compound codes are parallel-concatenated.

The channel-encoded input signals $a_1$ and $a_2$ are channel-encoded symbols, continuously output through the channel encoder (i.e. outer encoder). The symbols continuously output through the channel encoder are sequentially mapped to input terminals of the R-STTC encoder as the input signals $a_1$ and $a_2$.

The input signal $a_1$ is output as a symbol $S_{11}$ through the first binary adder 201 and the first delay 203, and then transmitted via the first transmission antenna TX1, and the symbol $S_{11}$ is fed back to the first binary adder 201 where it is added to a next input signal. An output symbol $S_{12}$ calculated by adding the current input signal to a previous signal in the first binary adder 201 is transmitted via the second transmission antenna TX2.

The input signal $a_2$ is output as a symbol $S_{21}$ through the second binary adder 205 and the second delay 207, and then transmitted via the first transmission antenna TX1, and the symbol $S_{21}$ is fed back to the second binary adder 205 where it is added to a next input signal. An output symbol $S_{22}$ calculated by adding the current input signal to a previous signal in the second binary adder 205 is transmitted via the second transmission antenna TX2.

The conventional R-STTC encoder adds channel-encoded input signals to their previous output signals, and then transmits output symbols delayed through the delays via one transmission antenna (i.e. the first transmission antenna). The R-STTC encoder transmits output symbols added through the binary adders via another transmission antenna (i.e. second transmission antenna) before being delayed by the delays.

When output symbols of the R-STTC encoder shown in FIG. 2 are expressed in the form of a matrix, the output matrix G(D) can be expressed as $$G(D) = (G_1, G_2) \quad (1)$$

$$= \begin{pmatrix} \frac{D}{(1+D)} & 0 & \frac{1}{(1+D)} & 0 \\ 0 & \frac{D}{(1+D)} & 0 & \frac{1}{(1+D)} \end{pmatrix}$$

In Equation (1), $G_1$ denotes a symbol output via the first transmission antenna TX1, and $G_2$ denotes a symbol output via the second transmission antenna TX2. D denotes a delay. In the matrix, each row represents a recursive convolutional code which is a compound code. A first row represents the first recursive convolutional encoder 200 and a second row represents the second recursive convolutional encoder 210. Each column represents an output symbol. The first two columns (i.e. first and second columns) represent output symbols of the R-STTC encoder, transmitted via the first transmission antenna, and the last two columns (i.e. third and fourth columns) represent output symbols of the R-STTC encoder, transmitted via the second transmission antenna. It can be noted that the conventional R-STTC encoder has a parallel concatenation structure of two non-systematic convolutional encoders.

So far, the structure of the QPSK-based R-STTC encoder has been described. Next, an 8PSK-based R-STTC encoder will be described with reference to FIG. 3.

FIG. 3 is a block diagram illustrating a structure of a conventional 8PSK modulation-based R-STTC encoder used as an inner encoder. Referring to FIG. 3, the R-STTC encoder is comprised of 3 binary adders 301, 305 and 309, and 3 delays 303, 307 and 311.

The R-STTC encoder illustrated in FIG. 3 outputs 6 STTC-encoded symbols $S_{11}$, $S_{21}$, S31, $S_{12}$, $S_{22}$ and $S_{32}$ for 3 channel-encoded input bits $a_1$ $a_2$ and $a_3$ by 8PSK modulation. Therefore, the R-STTC encoder has a structure comprised of three recursive convolutional codes.

Each of the recursive convolutional encoders is an encoder for generating compound codes with a code rate ½, and performs 8PSK modulation so that the three compound codes are parallel-concatenated.

The 8PSK modulation-based R-STTC encoder illustrated in FIG. 3 outputs 6 STTC-encoded symbols through recursive convolutional encoders 300, 310 and 320 in order to transmit channel-encoded input signals $a_1$, $a_2$ and $a_3$ via a first transmission antenna TX1 and a second transmission antenna TX2 while obtaining a space-time diversity effect.

The input signal $a_1$ is output as a symbol $S_{11}$ through the first binary adder 301 and the first delay 303, and then transmitted via the first transmission antenna TX1, and the symbol $S_{11}$ is fed back to the first binary adder 301 where it is added to a next input signal. An output symbol $S_{12}$ calculated by adding the current input signal to a previous signal in the first binary adder 301 is transmitted via the second transmission antenna TX2.

The input signal $a_2$ is output as a symbol $S_{21}$ through the second binary adder 305 and the second delay 307, and then transmitted via the first transmission antenna TX1, and the symbol $S_{21}$ is fed back to the second binary adder 305 where it is added to a next input signal. An output symbol $S_{22}$ calculated by adding the current input signal to a previous signal in the second binary adder 305 is transmitted via the second transmission antenna TX2.

The input signal $a_3$ is output as a symbol $S_{31}$ through the third binary adder 309 and the third delay 311, and then transmitted via the first transmission antenna TX1, and the symbol $S_{31}$ is fed back to the third binary adder 309 where it is added to a next input signal. An output symbol $S_{32}$ calculated by adding the current input signal to a previous signal in the third binary adder 309 is transmitted via the second transmission antenna TX2.

The 8PSK-based R-STTC encoder of FIG. 3, like the QPSK-based R-STTC encoder of FIG. 2, adds channel-encoded input signals to their previous output signals, and then transmits output symbols delayed through the delays via one transmission antenna (i.e., the first transmission antenna). The R-STTC encoder also transmits output symbols added through the binary adders via another transmission antenna (i.e., second transmission antenna) before being delayed by the delays.

When output symbols of the R-STTC encoder shown in FIG. 3 are expressed in the form of a matrix, the output matrix G(D) can be expressed as $$G(D) = (G_1, G_2) \qquad (2)$$
$$= \begin{pmatrix} \frac{D}{(1+D)} & 0 & 0 & \frac{1}{(1+D)} & 0 & 0 \\ 0 & \frac{D}{(1+D)} & 0 & 0 & \frac{1}{(1+D)} & 0 \\ 0 & 0 & \frac{D}{(1+D)} & 0 & 0 & \frac{1}{(1+D)} \end{pmatrix}$$

In Equation (2), $G_1$ denotes a symbol output via the first transmission antenna TX1, and $G_2$ denotes a symbol output via the second transmission antenna TX2. D denotes a delayer. In the matrix, each row represents a recursive convolutional code which is a compound code. A first row represents the first recursive convolutional encoder 300, a second row represents the second recursive convolutional encoder 310, and a third row represents the third recursive convolutional encoder 320. In addition, each column represents an output symbol. The first three columns (i.e., first, second and third columns) represent output symbols of the R-STTC encoder, transmitted via the first transmission antenna, and the last three columns (i.e., fourth, fifth and sixth columns) represent output symbols of the R-STTC encoder, transmitted via the second transmission antenna. It can be noted that the conventional R-STTC encoder has a parallel concatenation structure of three non-systematic convolutional encoders.

The conventional STTC code described above is capable of obtaining both coding gain and diversity gain, because it is a code designed by simultaneously taking channel coding, a modulation technique and use of multiple antennas into account. A method for forming SC-STC by serially concatenating an error correction code as the outer encoder shown in FIG. 1 with the STTC encoder is being actively studied.

However, in the future radio communication system requiring the increasing channel capacity and data rate in order to implement the 3G or 4G mobile communication system, performance improvement of the SC-STC is required. Although a study on a channel encoder as an outer encoder constituting the SC-STC is being actively perused, the studies on using an STTC encoder as the inner encoder is insufficient.

Furthermore, in the next generation mobile communication system aiming at transmitting data via multiple antennas with improved performance, improving performance for the STTC encoder is necessarily required.

SUMMARY OF THE INVENTION

It is, therefore, an object of the present invention to provide an encoding apparatus and method for improving transmission performance using systematic STTC codes in a multi-antenna mobile communication system.

It is another object of the present invention to provide an encoding apparatus and method for improving transmission performance using a hybrid STTC encoder in a multi-antenna mobile communication system.

It is further another object of the present invention to provide an encoding apparatus and method for improving transmission performance using a hybrid systematic STTC encoder in a multi-antenna mobile communication system.

In accordance with a first aspect of the present invention, there is provided a space-time trellis code (STTC) encoding apparatus having an outer encoder for performing channel coding and an inner encoder for performing the space-time coding, in a mobile communication system including one or more transmission antennas, the apparatus comprising a first binary adder for adding a first input signal output from the outer encoder to a symbol output from the first input signal, for transmission via a first transmission antenna; a first delay for delaying a signal output from the first binary adder and outputting the delayed signal to the first transmission antenna; a second binary adder for adding a second input signal output from the outer encoder to a symbol output from the second input signal, for transmission via the first transmission antenna; and a second delay for delaying a signal output from the second binary adder and outputting the delayed signal to the first transmission antenna.

In accordance with a second aspect of the present invention, there is provided a space-time trellis code (STTC) encoding apparatus having an outer encoder for performing channel coding and an inner encoder for performing the space-time coding, in a mobile communication system including one or more transmission antennas, the apparatus comprising a first binary adder for adding a first input signal output from the outer encoder to a symbol output from the first input signal, for transmission via a first transmission antenna, and outputting its addition result to a second transmission antenna; a first delay for delaying a signal output from the first binary adder and outputting the delayed signal to the first transmission antenna; a second binary adder for adding a second input signal output from the outer encoder to a symbol output from the second input signal, for transmission via the second transmission antenna, and outputting its addition result to the first transmission antenna; and a second delay for delaying a signal output from the second binary adder and outputting the delayed signal to the second transmission antenna.

In accordance with a third aspect of the present invention, there is provided a space-time trellis code (STTC) encoding apparatus having an outer encoder for performing channel coding and an inner encoder for performing the space-time coding, in a mobile communication system including one or more transmission antennas, the apparatus comprising a first binary adder for adding a first input signal output from the outer encoder to a symbol output from the first input signal, for transmission via a first transmission antenna; a first delay for delaying a signal output from the first binary adder and outputting the delayed signal to the first transmission antenna; a second binary adder for adding a second input signal output from the outer encoder to a symbol output from the second input signal, for transmission via a second transmission antenna; and a second delay for delaying a signal output from the second binary adder and outputting the delayed signal to the second transmission antenna.

In accordance with a fourth aspect of the present invention, there is provided a space-time trellis code (STTC) encoding apparatus having an outer encoder for performing channel coding and an inner encoder for performing the space-time coding, in a mobile communication system including one or more transmission antennas, the apparatus comprising a first binary adder for adding a first input signal output from the outer encoder to a symbol output from the first input signal, for transmission via a first transmission antenna; a first delay for delaying a signal output from the first binary adder and outputting the delayed signal to the first transmission antenna; a second binary adder for adding a second input signal output from the outer encoder to a symbol output from the second input signal, for transmission via the first transmission antenna; a second delay for delaying a signal output from the second binary adder and outputting the delayed signal to the first transmission antenna; a third binary adder for adding a third input signal output from the outer encoder to a symbol output from the third input signal, for transmission via a second transmission antenna; and a third delay for delaying a signal output from the third binary adder and outputting the delayed signal to the second transmission antenna.

In accordance with a fifth aspect of the present invention, there is provided a space-time trellis code (STTC) encoding method for performing space-time coding of a serially-concatenated space-time code (SC-STC) in an encoder having an outer encoder for performing channel coding and an inner encoder for performing the space-time coding, in a mobile communication system including one or more transmission antennas, the method comprising the steps of transmitting via a first transmission antenna a symbol generated by encoding a first input signal output from the outer encoder by a first recursive convolutional encoder and a symbol generated by encoding a second input signal output from the outer encoder by a second recursive convolutional encoder; and transmitting input signals via a second transmission antenna the first and second.

In accordance with a sixth aspect of the present invention, there is provided a space-time trellis code (STTC) encoding method for performing space-time coding of a serially-concatenated space-time code (SC-STC) in an encoder having an outer encoder for performing channel coding and an inner encoder for performing the space-time coding in a mobile communication system including one or more transmission antennas, the method comprising the steps of outputting to a first transmission antenna a symbol generated by encoding a first input signal output from the outer encoder by a first recursive convolutional encoder and a symbol output at a particular tap in a second recursive convolutional encoder for a second input signal output from the outer encoder; and outputting to a second transmission antenna a symbol generated by encoding the second input signal by the second recursive convolutional encoder and a symbol output at a particular tap in the first recursive convolutional encoder for the first input signal.

In accordance with a seventh aspect of the present invention, there is provided a space-time trellis code (STTC) encoding method for performing space-time coding of a serially-concatenated space-time code (SC-STC) in an encoder having an outer encoder for performing channel coding and an inner encoder for performing the space-time coding in a mobile communication system including one or more transmission antennas, the method comprising the steps of: outputting to a first transmission antenna a symbol generated by encoding a first input signal output from the outer encoder by a first recursive convolutional encoder and a second input signal output from the outer encoder; and outputting to a second transmission antenna a symbol generated by encoding the second input signal output from the outer encoder by a second recursive convolutional encoder and the first input signal.

In accordance with an eighth aspect of the present invention, there is provided a space-time trellis code (STTC) encoding method for performing space-time coding of a serially-concatenated space-time code (SC-STC) in an encoder having an outer encoder for performing channel coding and an inner encoder for performing the space-time coding in a mobile communication system including one or more transmission antennas, the method comprising the steps of: outputting to a first transmission antenna a symbol generated by encoding a first input signal output from the outer encoder by a first recursive convolutional encoder, a symbol generated by encoding a second input signal output from the outer encoder by a second recursive convolutional encoder and a third input signal output from the outer encoder; and outputting to a second transmission antenna a symbol generated by encoding the third input signal output from the outer encoder by a third recursive convolutional encoder and the first and second input signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention relates to SC-STC that uses an STTC encoder as an inner encoder, and improves a structure of the STTC encoder to be more suitable for the SC-STC. Although compound codes constituting the conventional R-STTC encoder are non-systematic, the present invention changes the compound codes to systematic codes and modifies combinations of output bits of the compound codes to increase a minimum distance of the SC-STC, thereby improving performance of a frame error rate (FER). The present invention can also add a space interleaver to the existing R-STTC encoder, facilitating its implementation.

Recursive convolutional codes having a code rate of ½ are used as compound codes in the STTC encoder used in the present invention, and the compound codes are parallel-concatenated in implementing QPSK, 8PSK, 16PSK and the like. The present invention proposes an STTC encoder suitable for SC-STC. Compound codes in the STTC encoder according to the present invention can be changed, and can be implemented in various ways by changing a combination of output bits of a specific compound code.

Among factors affecting performance of the SC-STC, two major factors include a type of the compound code and a combination of output bits of the compound code. Generally, the STTC encoder is constructed by a process of selecting a proper convolutional code and then determining a combination of output bits.

In embodiments of the present invention, a systematic code is used for a recursive convolutional code as the compound code, and in an alternative embodiment, a combination of output bits of the recursive convolutional code for the STTC encoder is changed to improve performance of the SC-STC.

Figure 4A:
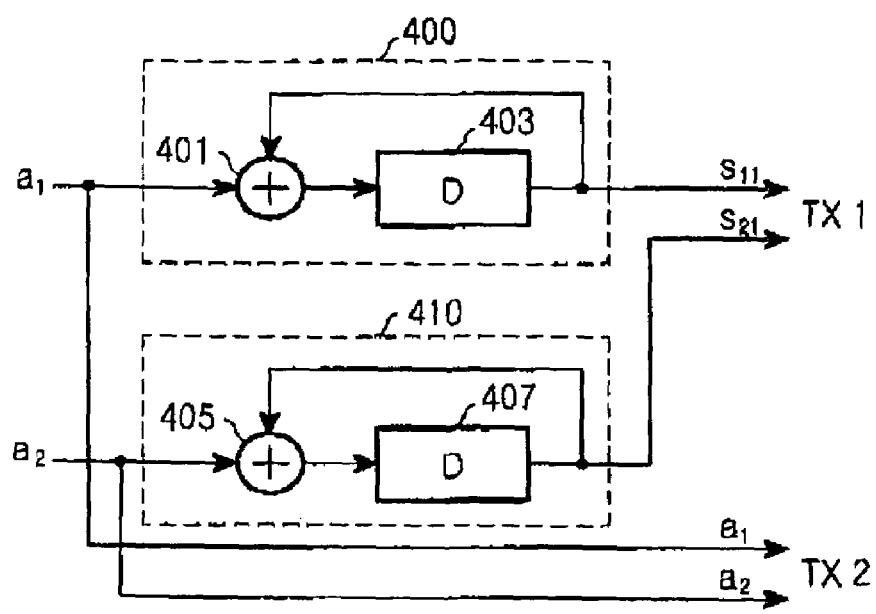
FIG. 4A is a block diagram illustrating a structure of a QPSK modulation-based STTC encoder according to a first embodiment of the present invention.
Figure 4B:
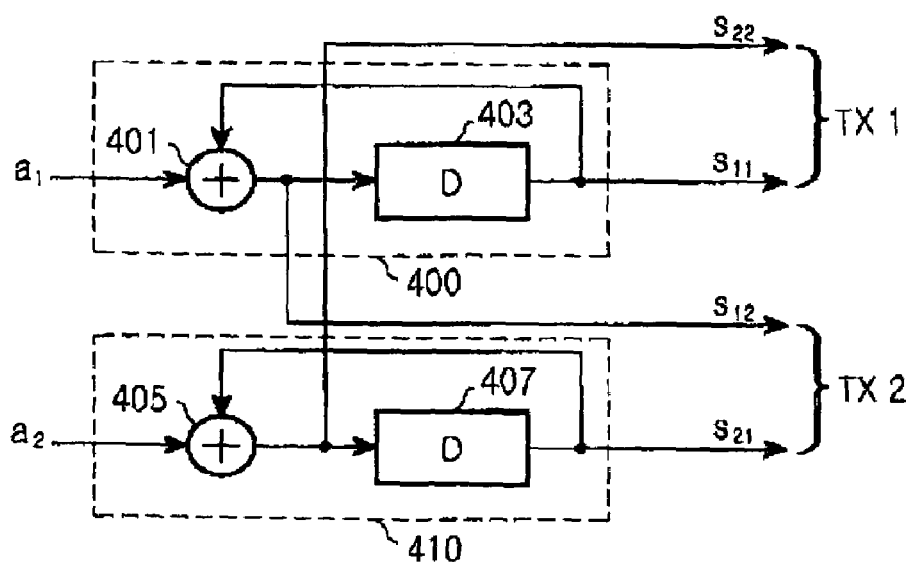
FIG. 4B is a block diagram illustrating a structure of a QPSK modulation-based STTC encoder according to a second embodiment of the present invention.
Figure 4C:
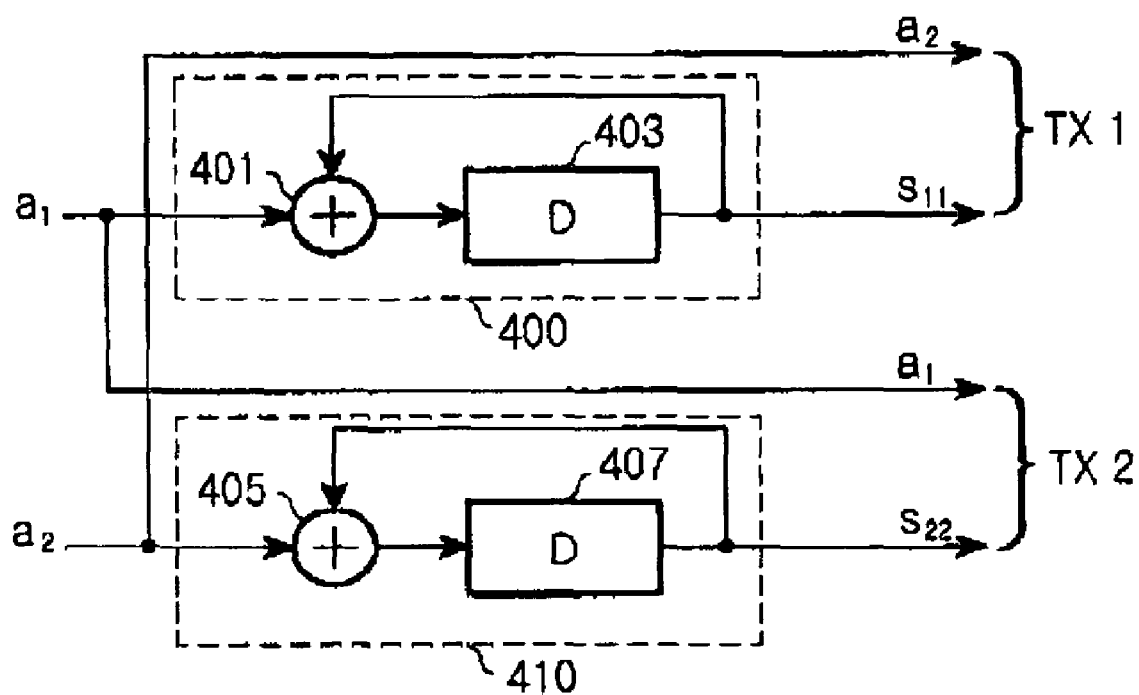
FIG. 4C is a block diagram illustrating a structure of a QPSK modulation-based STTC encoder according to a third embodiment of the present invention.

With reference to FIGS. 4A to 4C, a QPSK modulation-based STTC encoder according to embodiments of the present invention will be described, and with reference to FIG. 5, an 8PSK modulation-based STTC encoder according to an alternative embodiment of the present invention will be described.

First Embodiment

With reference to FIG. 4A, a description will now be made of an STTC encoder according to a first embodiment of the present invention. The first embodiment is implemented using a systematic convolutional code for a recursive convolutional encoder instead of using the conventional non-systematic convolutional code.

FIG. 4A is a block diagram illustrating a structure of a QPSK modulation-based STTC encoder according to the first embodiment of the present invention. The first embodiment of the present invention proposes a systematic recursive STTC (SR-STTC) encoder that outputs input signals of the STTC encoder as output signals of the STTC encoder. The SR-STTC encoder outputs the intact input symbols together with output symbols encoded by recursive convolutional encoders used as compound codes.

Referring to FIG. 4A, the STTC encoder (i.e. SR-STTC encoder) according to the first embodiment of the present invention is comprised of two binary adders 401 and 405 and two delays 403 and 407. The STTC encoder illustrated in FIG. 4A outputs 4 STTC-encoded symbols $S_{11}, S_{21}, a_1$ and $a_2$ for 2 channel-encoded input symbols $a_1$ and $a_2$ by QPSK modulation. The STTC encoder has a 2-recursive convolutional code structure. The number of the recursive convolutional encoders can be changed according to a change in a modulation method, and the number of the binary adders and delays can also be increased accordingly. The number of the binary adders and delays can be changed depending on how the recursive convolutional encoders are implemented. For example, an 8-ary phase shift keying (8PSK) modulation-based STTC encoder is comprised of 3 binary adders and 3 delays, and a description thereof will be made with reference to FIG. 5. The number of binary adders and delays can also be changed according to how the recursive convolutional encoders constituting the STTC encoder are formed. In the same manner, the STTC encoder according to the first embodiment can also be implemented based on 16QAM, 64QAM, 128QAM, and the like.

The QPSK modulation-based SR-STTC encoder according to the first embodiment illustrated in FIG. 4A outputs 4 STTC-encoded symbols through systematic recursive convolutional encoders 400 and 410 in order to transmit channel-encoded input signals $a_1$ and $a_2$ via a first transmission antenna TX1 and a second transmission antenna TX2 while obtaining a space-time diversity effect. Each of the recursive convolutional encoders is an encoder for generating compound codes with a code rate of ½ for the SR-STTC encoder according to the first embodiment, and performs QPSK modulation so that the two compound codes are parallel-concatenated.

The channel-encoded input signals $a_1$ and $a_2$ are channel-encoded symbols, continuously output through the channel encoder (i.e. outer encoder). The symbols continuously output through the channel encoder are sequentially mapped to input terminals of the SR-STTC encoder as the input signals $a_1$ and $a_2$.

The input signal $a_1$ is output as a symbol $S_{11}$ through the first binary adder 401 and the first delay 403, and then transmitted via the first transmission antenna TX1, and the symbol $S_{11}$ is fed back to the first binary adder 401 where it is added to a next input signal. Here, a structure for adding (accumulating) a previous signal, delayed by a delay, to a next signal is generally referred to as an accumulator. The intact input signal $a_1$ is output via the second transmission antenna TX2 without passing through the first binary adder 401.

The input signal $a_2$ is output as a symbol $S_{21}$ through the second binary adder 405 and the second delay 407, and then transmitted via the first transmission antenna TX1, and the symbol $S_{21}$ is fed back to the second binary adder 405 where it is added to a next input signal. The intact input signal $a_2$ is output via the second transmission antenna TX2 without passing through the second binary adder 405.

The SR-STTC encoder according to the first embodiment becomes a systematic recursive STTC encoder because the intact input signals $a_1$ and $a_2$ are output via the second transmission antenna TX2.

When output symbols of the SR-STTC encoder according to the first embodiment shown in FIG. 4A are expressed in the form of a matrix, the output matrix G(D) can be expressed as $$G(D) = (G_1, G_2) \qquad (3)$$

$$= \begin{pmatrix} \frac{D}{(1+D)} & 0 & 1 & 0 \\ 0 & \frac{D}{(1+D)} & 0 & 1 \end{pmatrix}$$

In Equation (3), $G_1$ denotes a symbol output via the first transmission antenna TX1, and $G_2$ denotes a symbol output via the second transmission antenna TX2. D denotes a delayer. In the matrix, each row represents a recursive convolutional code which is a compound code. A first row represents the first recursive convolutional encoder 400 and a second row represents the second recursive convolutional encoder 410. Each column represents an output symbol. The first two columns (i.e. first and second columns) represent output symbols of the SR-STTC encoder, transmitted via the first transmission antenna, and the last two columns (i.e. third and fourth columns) represent output symbols of the SR-STTC encoder, transmitted via the second transmission antenna.

As can be understood from Equation (3), a symbol $G_2$ output via the second transmission antenna is formed in a 2×2 unit matrix. This implies that input and output values of the $G_2$ matrix are identical to each other. It is noted that the SR-STTC is a systematic encoder.

Second Embodiment

Figure 1:
FIG. 1 is a block diagram illustrating a structure of a general transmitter using a serially-concatenated space-time code encoding apparatus.
Figure 2:
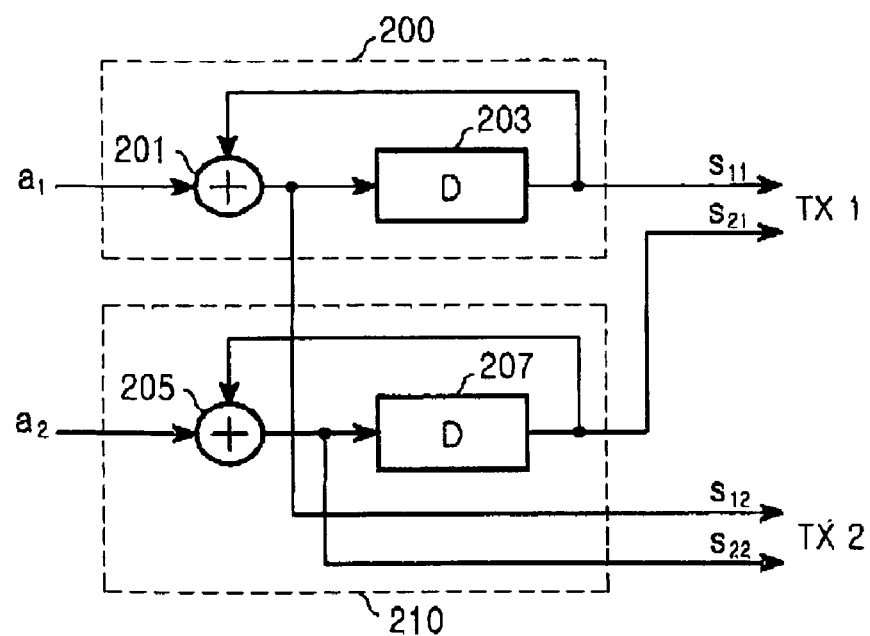
FIG. 2 is a block diagram illustrating a structure of a conventional QPSK modulation-based R-STTC encoder used as an inner encoder.
Figure 3:
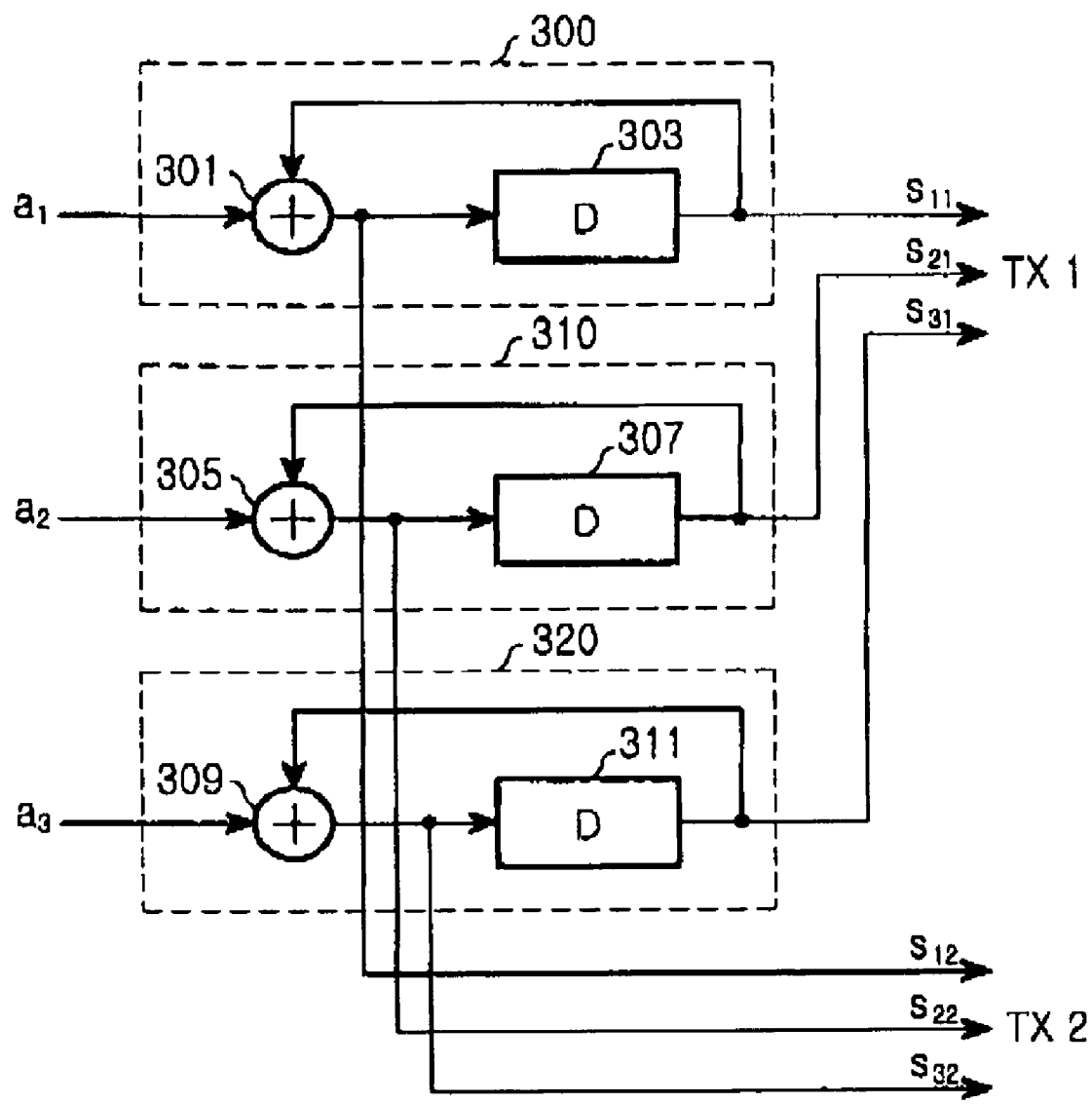
FIG. 3 is a block diagram illustrating a structure of a conventional 8PSK modulation-based R-STTC encoder used as an inner encoder.

With reference to FIG. 4B, a description will now be made of an STTC encoder according to a second embodiment of the present invention. The second embodiment provides a method for mixing output bits of two accumulators with symbols to be transmitted via two different transmission antennas, and then distributing the mixed signals. As described in the related art section, the conventional STTC encoder illustrated in FIG. 2 transmits output symbols of two accumulators via one transmission antenna (e.g., the first transmission antenna), and transmits two output symbols before being delayed by the delays via another transmission antenna (e.g., second transmission antenna). However, the second embodiment of the present invention proposes a hybrid method of transmitting output symbols in the same position, output from two convolutional encoders, via two different transmission antennas.

FIG. 4B is a block diagram illustrating a structure of a QPSK modulation-based STTC encoder according to the second embodiment of the present invention. The second embodiment of the present invention proposes a hybrid recursive STTC (HR-STTC) encoder that transmits output symbols in the same position from two convolutional encoders constituting the STTC encoder as output signals of the STTC encoder, via different transmission antennas.

Referring to FIG. 4B, the STTC encoder (i.e. HR-STTC encoder) according to the second embodiment of the present invention is comprised of two binary adders 401 and 405 and two delays 403 and 407. The STTC encoder illustrated in FIG. 4B outputs 4 STTC-encoded symbols $S_{11}$, $S_{22}$, $s_{21}$ and $S_{12}$ for 2 channel-encoded input symbols $a_1$ and $a_2$ by QPSK modulation. The STTC encoder has a 2-recursive convolutional code structure. The number of the recursive convolutional encoders can be changed according to a change in a modulation method, and the number of the binary adders and delays can also be changed accordingly. The number of the binary adders and delays can be changed depending on how the recursive convolutional encoders are implemented. For example, an 8PSK modulation-based STTC encoder is comprised of 3 binary adders and 3 delays, and in the same manner, the STTC encoder according to the second embodiment can also be implemented based on 16QAM, 64QAM, 128QAM, and the like.

The QPSK modulation-based HR-STTC encoder according to the second embodiment illustrated in FIG. 4B outputs 4 STTC-encoded symbols through systematic recursive convolutional encoders 400 and 410 in order to transmit channel-encoded input signals $a_1$ and $a_2$ via a first transmission antenna TX1 and a second transmission antenna TX2 while obtaining a space-time diversity effect. Each of the recursive convolutional encoders is an encoder for generating compound codes with a code rate of ½ for the HR-STTC encoder according to the second embodiment, and performs QPSK modulation so that the two compound codes are parallel-concatenated.

The channel-encoded input signals $a_1$ and $a_2$ are channel-encoded symbols, continuously output through the channel encoder (i.e. outer encoder). The symbols continuously output through the channel encoder are sequentially mapped to input terminals of the HR-STTC encoder as the input signals $a_1$ and $a_2$.

The input signal $a_1$ is output as a symbol $S_{11}$ through the first binary adder 401 and the first delay 403, and then transmitted via the first transmission antenna TX1, and the symbol $S_1$ is fed back to the first binary adder 401 where it is added to a next input signal. Here, a structure for adding (accumulating) a previous signal delayed by a delay to a next signal is generally referred to as an accumulator. An output symbol $S_{12}$ calculated by adding the current input signal to a previous signal in the first binary adder 401 is output via the second transmission antenna TX2.

The input signal $a_2$ is output as a symbol $S_{21}$ through the second binary adder 405 and the second delay 407, and then transmitted via the second transmission antenna TX2, and the symbol $S_{21}$ is fed back to the second binary adder 405 where it is added to a next input signal. An output symbol $S_{22}$, calculated by adding the current input signal to a previous signal in the second binary adder 405, is output via the first transmission antenna TX1. The symbol $S_{21}$ output through the second binary adder 405 and the second delay 407 is transmitted via the second transmission antenna TX2 instead of the first transmission antenna TX1.

The HR-STTC encoder according to the second embodiment transmits output symbols in the same position from the two accumulators constituting the HR-STTC encoder, via different transmission antennas.

When output symbols of the HR-STTC encoder according to the second embodiment shown in FIG. 4B are expressed in the form of a matrix, the output matrix G(D) can be expressed as $$G(D) = (G_1, G_2) \qquad (4)$$

$$= \begin{pmatrix} 0 & \frac{D}{(1+D)} & \frac{1}{(1+D)} & 0 \\ \frac{1}{(1+D)} & 0 & 0 & \frac{D}{(1+D)} \end{pmatrix}$$

In Equation (4), $G_1$ denotes a symbol output via the first transmission antenna TX1, and $G_2$ denotes a symbol output via the second transmission antenna TX2. D denotes a delayer. In the matrix, each row represents a recursive convolutional code which is a compound code. A first row represents the first recursive convolutional encoder 400 and a second row represents the second recursive convolutional encoder 410. Each column represents an output symbol. The first two columns (first and second columns) represent output symbols of the HR-STTC encoder, transmitted via the first transmission antenna, and the last two columns (third and fourth columns) represent output symbols of the HR-STTC encoder, transmitted via the second transmission antenna.

As can be understood from Equation (4), it is noted that an input/output matrix of the HR-STTC according to the second embodiment has a hybrid structure. Symbols in the same position, output through the respective recursive convolutional encoders, are transmitted via different transmission antennas. The HR-STTC encoder according to the second embodiment can be implemented by adding a space interleaver to the existing R-STTC encoder.

Third Embodiment

With reference to FIG. 4C, a description will now be made of an STTC encoder according to a third embodiment of the present invention. The third embodiment is implemented using a systematic convolutional code for a recursive convolutional encoder instead of using the conventional non-systematic convolutional code, like the first embodiment. The third embodiment is implemented using the hybrid method used in the second embodiment.

FIG. 4C is a block diagram illustrating a structure of a QPSK modulation-based STTC encoder according to the third embodiment of the present invention. The third embodiment of the present invention proposes a hybrid systematic recursive STTC (HSR-STTC) encoder that outputs intact input signals of the STTC encoder as output signals of the STTC encoder, and transmits output symbols of recursive convolutional encoders constituting the STTC encoder via different transmission antennas. The third embodiment forms a systematic encoder by outputting the intact input symbols together with output symbols encoded by recursive convolutional encoders used as compound codes, and forms a hybrid encoder by transmitting output symbols of each recursive convolutional encoder via different transmission antennas.

Referring to FIG. 4C, the STTC encoder (i.e. HSR-STTC encoder) according to the third embodiment of the present invention is comprised of two binary adders 401 and 405 and two delays 403 and 407. The STTC encoder illustrated in FIG. 4C outputs 4 STTC-encoded symbols $S_{11}$, $S_{21}$, $a_1$ and $a_2$ for 2 channel-encoded input symbols $a_1$ and $a_2$ by QPSK modulation. The STTC encoder has a 2-recursive convolutional code structure. The number of the recursive convolutional encoders can be changed according to a change in a modulation method, and the number of the binary adders and delays can also be changed accordingly. In addition, the number of the binary adders and delays can be changed depending on how the recursive convolutional encoders are implemented. For example, an 8PSK modulation-based STTC encoder is comprised of 3 binary adders and 3 delays, and a description thereof will be made with reference to FIG. 5. The STTC encoder according to the third embodiment can also be implemented based on 16QAM, 64QAM, 128QAM, and the like.

The QPSK modulation-based HSR-STTC encoder according to the third embodiment illustrated in FIG. 4C outputs 4 STTC-encoded symbols through systematic recursive convolutional encoders 400 and 410 in order to transmit channel-encoded input signals $a_1$ and $a_2$ via a first transmission antenna TX1 and a second transmission antenna TX2 while obtaining a space-time diversity effect. Each of the recursive convolutional encoders is an encoder for generating compound codes with a code rate of ½ for the HSR-STTC encoder according to the third embodiment, and performs QPSK modulation so that the two compound codes are parallel-concatenated.

The channel-encoded input signals $a_1$ and $a_2$ are channel-encoded symbols, continuously output through the channel encoder (i.e. outer encoder). The symbols continuously output through the channel encoder are sequentially mapped to input terminals of the HSR-STTC encoder as the input signals $a_1$ and $a_2$.

The input signal $a_1$ is output as a symbol $S_{11}$ through the first binary adder 401 and the first delay 403, and then transmitted via the first transmission antenna TX1, and the symbol $S_{11}$ is fed back to the first binary adder 401 where it is added to a next input signal. Here, a structure for adding (accumulating) a previous signal delayed by a delay to a next signal is generally referred to as an accumulator. Meanwhile, the intact input signal $a_1$ is output via the second transmission antenna TX2 without passing through the first binary adder 401.

The input signal $a_2$ is output as a symbol $S_{21}$ through the second binary adder 405 and the second delay 407, and then transmitted via the second transmission antenna TX2, and the symbol $S_{21}$ is fed back to the second binary adder 405 where it is added to a next input signal. The intact input signal $a_2$ is output via the first transmission antenna TX1 without passing through the second binary adder 405.

The HSR-STTC encoder according to the third embodiment becomes a systematic recursive STTC encoder because the intact input signals $a_1$ and $a_2$ are output via the first and second transmission antennas TX1 and TX2. The HSR-STTC encoder becomes a hybrid recursive STTC encoder because the symbol $S_{11}$ and $S_{21}$ output through the respective accumulators and the input signals $a_1$ and $a_2$ are transmitted via different transmission antennas.

When output symbols of the HSR-STTC encoder according to the third embodiment shown in FIG. 4C are expressed in the form of a matrix, the output matrix G(D) can be expressed as $$G(D) = (G_1, G_2) \quad (5)$$

$$= \begin{pmatrix} 0 & \frac{D}{(1+D)} & 1 & 0 \\ 1 & 0 & 0 & \frac{D}{(1+D)} \end{pmatrix}$$

In Equation (5), $G_1$ denotes a symbol output via the first transmission antenna TX1, and $G_2$ denotes a symbol output via the second transmission antenna TX2. D denotes a delayer. In the matrix, each row represents a recursive convolutional code which is a compound code. A first row represents the first recursive convolutional encoder 400 and a second row represents the second recursive convolutional encoder 410. Each column represents an output symbol. The first two columns (first and second columns) represent output symbols of the HSR-STTC encoder, transmitted via the first transmission antenna, and the last two columns (third and fourth columns) represent output symbols of the HSR-STTC encoder, transmitted via the second transmission antenna.

As can be understood from Equation (5), it is noted that the HSR-STTC encoder is a systematic encoder because the intact input symbols are output in such a manner that the input symbol $a_2$ is transmitted via the first transmission antenna and the input symbol $a_1$ is transmitted via the second transmission antenna.

It can be noted from Equation (5) that an input/output matrix of the HSR-STTC according to the third embodiment has a hybrid structure. That is, symbols in the same position, output through the respective recursive convolutional encoders, are transmitted via different transmission antennas. The HSR-STTC encoder according to the third embodiment can be implemented by adding a space interleaver to the SR-STTC encoder according to the first embodiment.

A description has been made of a QPSK modulation-based STTC encoder according to the first to third embodiments of the present invention. Next, a description will be made of an 8PSK modulation-based STTC encoder according to an alternative embodiment of the present invention.

Fourth Embodiment

Figure 5:
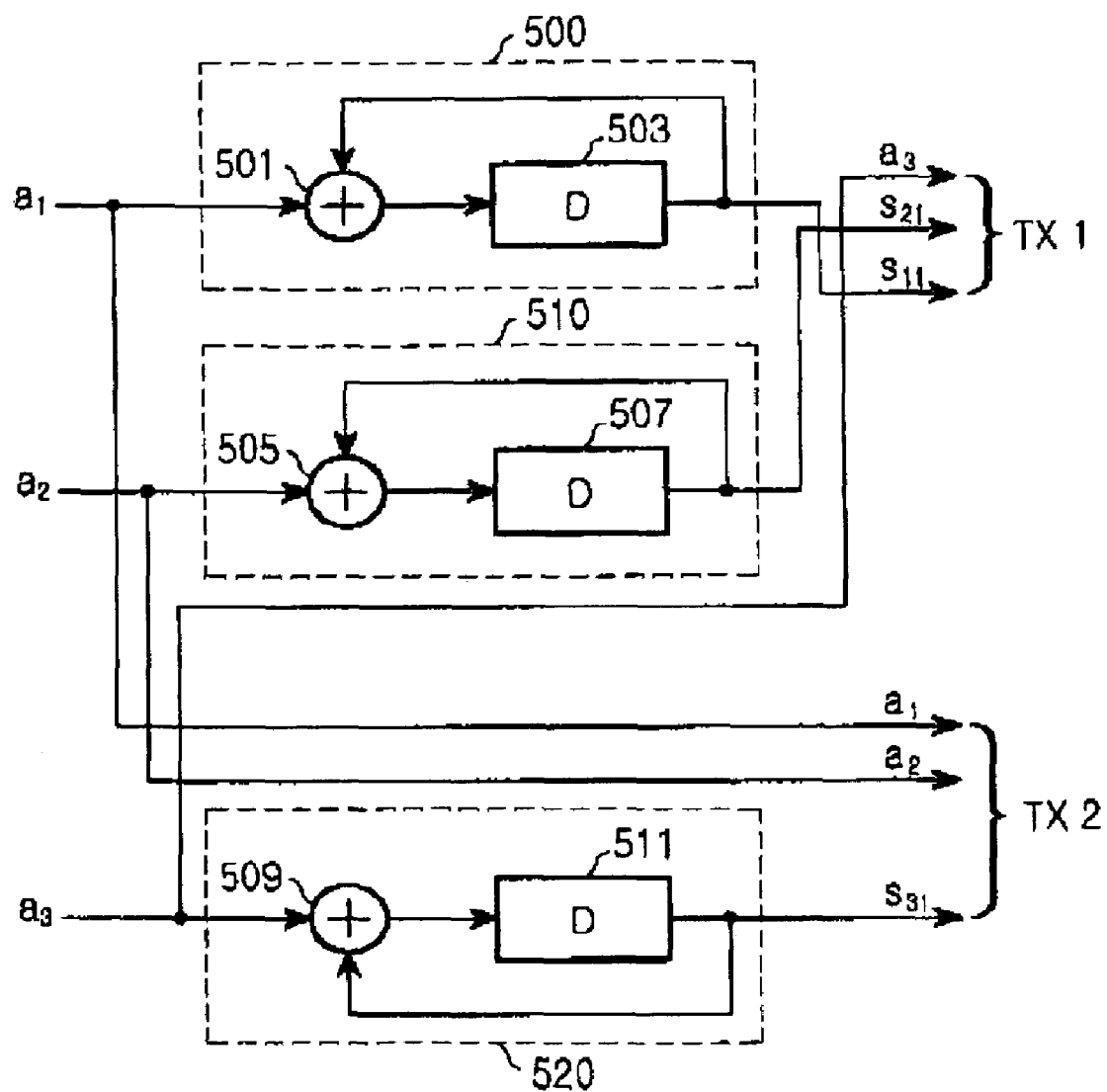
FIG. 5 is a block diagram illustrating a structure of an 8PSK modulation-based STTC encoder according a fourth embodiment of the present invention.

FIG. 5 is a block diagram illustrating a structure of an 8PSK modulation-based HSR-STTC encoder used as an inner encoder according a fourth embodiment of the present invention.

Referring to FIG. 5, the HSR-STTC encoder according to the fourth embodiment is comprised of three binary adders 501, 505 and 509, and three delays 503, 507 and 511. The HSR-STTC encoder illustrated in FIG. 5 outputs 6 STTC-encoded symbols $S_{11}$, $S_{21}$, $s_{31}$, $a_1$, $a_2$ and $a_3$ for 3 channel-encoded input symbols $a_1$, $a_2$ and $a_3$ by 8PSK modulation. The HSR-STTC encoder has a 3-recursive convolutional code structure.

Each of the recursive convolutional encoders is an encoder for generating compound codes with a code rate of ½, and performs 8PSK modulation so that the three compound codes are parallel-concatenated.

The 8PSK modulation-based HSR-STTC encoder illustrated in FIG. 5 outputs 6 STTC-encoded symbols through recursive convolutional encoders 500, 510 and 520 in order to transmit channel-encoded input signals $a_1$, $a_2$ and $a_3$ via a first transmission antenna TX1 and a second transmission antenna TX2 while obtaining a space-time diversity effect.

The input signal $a_1$ is output as a symbol $S_{11}$ through the first binary adder 501 and the first delay 503, and then transmitted via the first transmission antenna TX1, and the symbol $S_{11}$ is fed back to the first binary adder 501 where it is added to a next input signal. The intact input signal $a_1$ is output via the second transmission antenna TX2 without passing through the first binary adder 501.

The input signal $a_2$ is output as a symbol $S_{21}$ through the second binary adder 505 and the second delay 507, and then transmitted via the first transmission antenna TX1, and the symbol $S_{21}$ is fed back to the second binary adder 505 where it is added to a next input signal. The intact input signal $a_2$ is output via the second transmission antenna TX2 without passing through the second binary adder 505.

The input signal $a_3$ is output as a symbol $S_{31}$ through the third binary adder 509 and the third delay 511, and then transmitted via the second transmission antenna TX2, and the symbol $S_{31}$ is fed back to the third binary adder 509 where it is added to a next input signal. The intact input signal $a_3$ is output via the first transmission antenna TX1 without passing through the third binary adder 509.

The HSR-STTC encoder according to the fourth embodiment becomes a systematic recursive STTC encoder because the intact input signals $a_1$, $a_2$ and $a_3$ are output via the first and second transmission antennas. In addition, the HSR-STTC encoder becomes a hybrid recursive STTC encoder because the signals $S_{11}$, $S_{21}$ and $S_{31}$ output through the respective accumulators and the input signals $a_1$, $a_2$ and $a_3$ are transmitted via different transmission antennas.

When output symbols of the HSR-STTC encoder shown in FIG. 5 are expressed in the form of a matrix, the output matrix G(D) can be expressed as $$G(D) = (G_1, G_2) \qquad (6)$$

$$= \begin{pmatrix} 0 & 0 & \frac{D}{(1+D)} & 1 & 0 & 0 \\ 0 & \frac{D}{(1+D)} & 0 & 0 & 1 & 0 \\ 1 & 0 & 0 & 0 & 0 & \frac{D}{(1+D)} \end{pmatrix}$$

In Equation (6), $G_1$ denotes a symbol output via the first transmission antenna TX1, and $G_2$ denotes a symbol output via the second transmission antenna TX2. D denotes a delayer. In the matrix, each row represents a recursive convolutional code which is a compound code. A first row represents the first recursive convolutional encoder 500, a second row represents the second recursive convolutional encoder 510, and a third row represents the third recursive convolutional encoder 520. In addition, each column represents an output symbol. The first three columns (first, second and third columns) represent output symbols of the HSR-STTC encoder, transmitted via the first transmission antenna, and the last three columns (fourth, fifth and sixth columns) represent output symbols of the HSR-STTC encoder, transmitted via the second transmission antenna.

As can be understood from Equation (6), it is noted that the HSR-STTC encoder is a systematic encoder because the intact input symbols are output in such a manner that the input symbol $a_3$ is transmitted via the first transmission antenna and the input symbols $a_1$ and $a_2$ are transmitted via the second transmission antenna.

It can be noted from Equation (6) that an input/output matrix of the HSR-STTC according to the fourth embodiment has a hybrid structure. That is, symbols in the same position, output through the respective recursive convolutional encoders, are transmitted via different transmission antennas.

A description has been made of an STTC encoder based on QPSK and 8PSK modulations according to the first to fourth embodiments of the present invention. In the possible embodiments of the present invention, the STTC encoder is implemented in a systematic encoder or a hybrid encoder.

The present invention improves performance by changing an output method of a conventional STTC encoder formed using recursive convolutional encoders. For that purpose, the present invention proposes a systematic STTC encoder for outputting the intact input bits, a hybrid STTC encoder for mapping bits output from respective recursive convolutional encoders to different transmission antennas before transmission, and a hybrid systematic STTC encoder composed of the systematic STTC encoder and the hybrid STTC encoder. In implementing an STTC encoder according to an embodiment of the present invention, each of the recursive convolutional encoders can be modified in any type, and in the foregoing description, the recursive convolutional encoder is comprised of one binary adder and one delay by way of example, for the convenience of explanation.

A performance comparison between the embodiments of the present invention and the prior art will now be made with reference to FIGS. 6A and 6B.

Figure 6A:
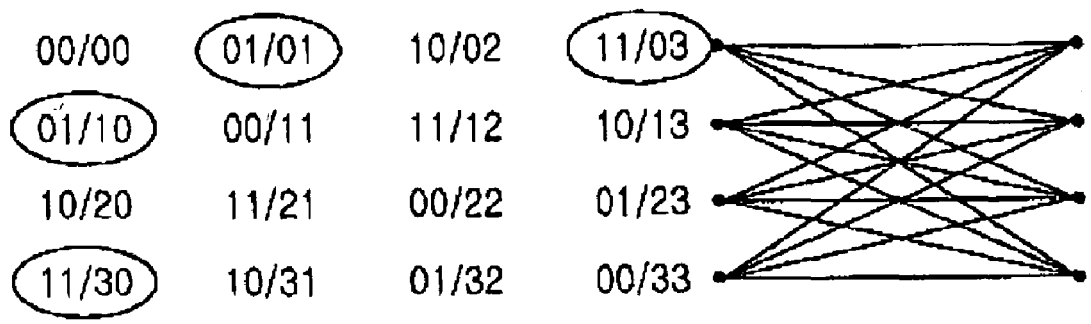
FIGS. 6A and 6B are diagrams illustrating a performance comparison between the prior art and the third embodiment of the present invention.
Figure 6B:
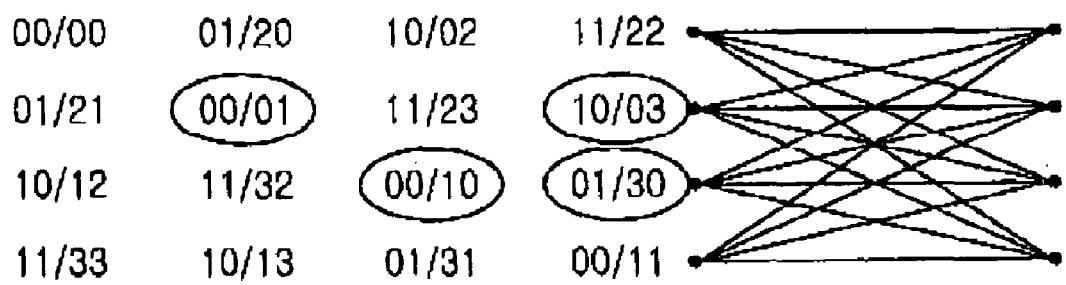

FIGS. 6A and 6B are diagrams illustrating a performance comparison between the prior art and the third embodiment of the present invention due to a difference in a trellis structure. Specifically, FIG. 6A is a diagram illustrating a state transition relationship between input/output symbols according to the prior art, and FIG. 6B is a diagram illustrating a state transition relationship between input/output symbols in the third embodiment of the present invention, i.e. in the QPSK modulation-based HSR-STTC encoder.

Referring to FIGS. 6A and 6B, in an expression '00/00', the first two numerals denote two input signal bits and have a binary value of '0' or '1'. For example, in FIG. 4C, '00/00' means that $a_1=0$ and $a_2=0$. Further, the last two numerals denote symbols output to the antennas, and one of the symbols is a QPSK symbol as illustrated in FIG. 4C. In FIG. 6, for the convenience of expression, a value '0' becomes a value '1' on a QPSK symbol, a value '1' becomes a value 'j' on a QPSK symbol, a value '2' becomes a value '−1' on a QPSK symbol, and a value '3' becomes a value '−j' on a QPSK symbol.

In FIG. 6A, a circled element is data selected for comparison with an embodiment of the present invention, and represents an input/output mapping value having the most possibly defective sequences '01', '10', '01' and '30' among sequences simultaneously output via the two transmission antennas at a particular time t, as output sequences. It is noted that in a QPSK constellation diagram, sequences having the values '01', '10', '01' and '30' are the most possibly defective sequences. In the conventional STTC encoder, there can exist a value '01' or '11' as input sequences having the '01', '10', '01' and '30' as output sequences.

Likewise, in FIG. 6B, a circled element is data selected for comparison with the prior art, and represents an input/output mapping value having the most possibly defective sequences '01', '10', '01' and '30' as output sequences. Referring to FIG. 6B, it can be noted that different input sequences are provided for the same output sequences as the conventional output sequences because of a difference in structure of the STTC encoder according to the embodiment of the present invention. In the STTC encoder according to the third embodiment of the present invention, there exist a value '00', '01' or '10' as input sequences having the '01', '10', '01' and '30' as output sequences.

Comparing FIG. 6A with FIG. 6B, it can be noted that an input value of an encoder according to the embodiment of the present invention has relatively many '0's for the most possibly defective output sequences '01', '10', '01' and '30'. Generally, input signals to the STTC encoder have fewer '0's, for the following reasons. Signals input to the STTC encoder are signals which have already been channel-encoded in the above manner, and there is a high probability that '1' will occur when the signals are encoded considering a minimum distance in the channel coding process.

Based on such a fact, it is noted that error probability over the entire signal transmission is lower, compared with that of the prior art, because of low probability of an input value that can be the most possibly defective output values according to the embodiment of the present invention. Although the same input value is input, the number of possibly defective output symbols is less than that of the prior art, thus contributing to a reduction in error rate.

In order to make a comparison between the SR-STTC, HR-STTC and HSR-STTC encoders according to the embodiments of the present invention and the conventional R-STTC encoder, minimum diversity in an outer encoder can be calculated using Equation (7), which represents an upper bound of error probability in an independent fading channel. We consider the probability that a maximum-likelihood receiver decides erroneously in favor of a signal $e=[e_1, e_2, \ldots, e_t, \ldots, e_l]$ assuming that $c=[c_1, c_2, \ldots, c_t, \ldots, c_l]$ was transmitted $e_t$ and $c_t$ are the vectors in e and c at a time slot t, respectively.

$$P(C \to E) \leq \prod_{t \in v(C,E)} \left(|c_t - e_t|^2 \frac{E_s}{4N_0}\right)^{-m} = \quad (7)$$

$$\left(\prod_{t \in v(C,E)} |c_t - e_t|^2\right)^{-m} \left(\frac{E_s}{4N_0}\right)^{-|v(C,E)|m}$$

where $E_s$ is the transmitted energy per antenna, $N_0/2$ is the noise variance per dimension and m is the number of receive antennas.

A codeword C with a length l, transmitted by a total of n antennas, can be expressed in an n×l matrix by $$C = [C_1 \ldots C_t \ldots C_l] = \begin{bmatrix} c_1^1 & \ldots & c_t^1 & \ldots & c_l^1 \\ c_1^2 & \ldots & c_t^2 & \ldots & c_l^2 \\ c_1^3 & \ldots & c_t^3 & \ldots & c_l^3 \\ \ldots & & & & \\ c_1^n & \ldots & c_t^n & \ldots & c_l^n \end{bmatrix} \quad (8)$$

In Equation (7), v(C,E) denotes a set of columns in which different columns occur when columns of the C matrix are compared with columns of an E matrix. In addition, |v(C,E)| denotes the number of elements in each set.

In Equation (7), $|c_t - e_t|^2$ is calculated by $$|c_t - e_t|^2 = \sum_{i=1}^{n} |c_t^i - e_t^i|^2 \quad (9)$$

In Equation (9), 'n' denotes the number of input signals to the encoder. In the first to third embodiments (for QPSK), n=2, and in the fourth embodiment (for 8PSK), n=3. In Equation (7), 'm' denotes the number of reception antennas.

It can be understood from Equation (7) that for performance improvement on an SC-STC encoder, $$\left[\prod_{t \in v(C,B)} |c_t - e_t|^2\right] \text{ and } |c_t - e_t|^2 |v(C, E)|$$

must be maximized.

In experiments, initial diversities were calculated using Equation (7) by changing a minimum Hamming distance of codes used in an SC-STC outer encoder, and the calculation results are shown in Table 1 below.

TABLE 1

| Minimum Hamming distance of outer code | STTC used as inner code | | | | | |
|---|---|---|---|---|---|---|
| | QPSK | | | | 8PSK | |
| | HSR-STTC | HR-STTC | SR-STTC | R-STTC | HSR-STTC | R-STTC |
| d = 3 | 2 m | 2 m | 2 m | 2 m | 1 m | 1 m |
| d = 4 | 2 m | 2 m | 2 m | 2 m | 2 m | 2 m |

TABLE 1-continued

| Minimum Hamming distance of outer code | STTC used as inner code | | | | | |
|---|---|---|---|---|---|---|
| | QPSK | | | | 8PSK | |
| | HSR-STTC | HR-STTC | SR-STTC | R-STTC | HSR-STTC | R-STTC |
| d = 5 | 3 m | 3 m | 3 m | 3 m | 2 m | 2 m |
| d = 6 | 3 m | 3 m | 3 m | 3 m | 2 m | 2 m |
| d = 7 | 4 m | 4 m | 4 m | 4 m | 3 m | 3 m |
| d = 8 | 4 m | 4 m | 4 m | 4 m | 3 m | 3 m |

As can be understood from Table 1, the minimum diversity the SC-STC can obtain is related only to the minimum Hamming distance of a code for the outer encoder, but is independent from the inner encoder. However, in Table 2 below, it is noted that a minimum Euclidean distance of SC-STC (i.e. product of squared minimum Euclidean distances) used for the STTC encoder according to embodiments of the present invention is greater than that used for the existing R-STTC encoder. The calculation results on the product of squared minimum Euclidean distances based on a minimum Hamming distance of codes used in the outer encoder are shown in Table 2 below.

TABLE 2

| Minimum Hamming weight of the outer code | QPSK | | | | 8-PSK | |
|---|---|---|---|---|---|---|
| | R-STTC | SR-STTC | HR-STTC | HSR-STTC | R-STTC | HSR-STTC |
| 1 | 2 | 2 | 4 | 4 | 1.292962 | 0.005574 |
| 2 | 2 | 2 | 8 | 8 | 0.343146 | 0.356713 |
| 3 | 8 | 8 | 8 | 24 | 0.201010 | 0.275903 |
| 8 | 16 | 64 | 64 | 1024 | 0.117749 | 0.941993 |

Referring to Table 2, it is noted that a minimum distance of SC-STC for which HSR-STTC according to an embodiment of the present invention was used as a code for the inner encoder is dramatically reduced in both QPSK and 8PSK. Therefore, STTC encoders proposed in the embodiments of the present invention, particularly, the HSR-STTC encoder, when serially concatenated with the outer encoder, has a large minimum distance and produces performance improvement compared with the existing R-STTC encoder.

Simulation Results

A performance comparison between embodiments (SR-STTC, HR-STTC and HSR-STTC encoders) of the present invention and the prior art (R-STTC encoder) will be made with reference to FIGS. 7A to 7C.

Figure 7A:
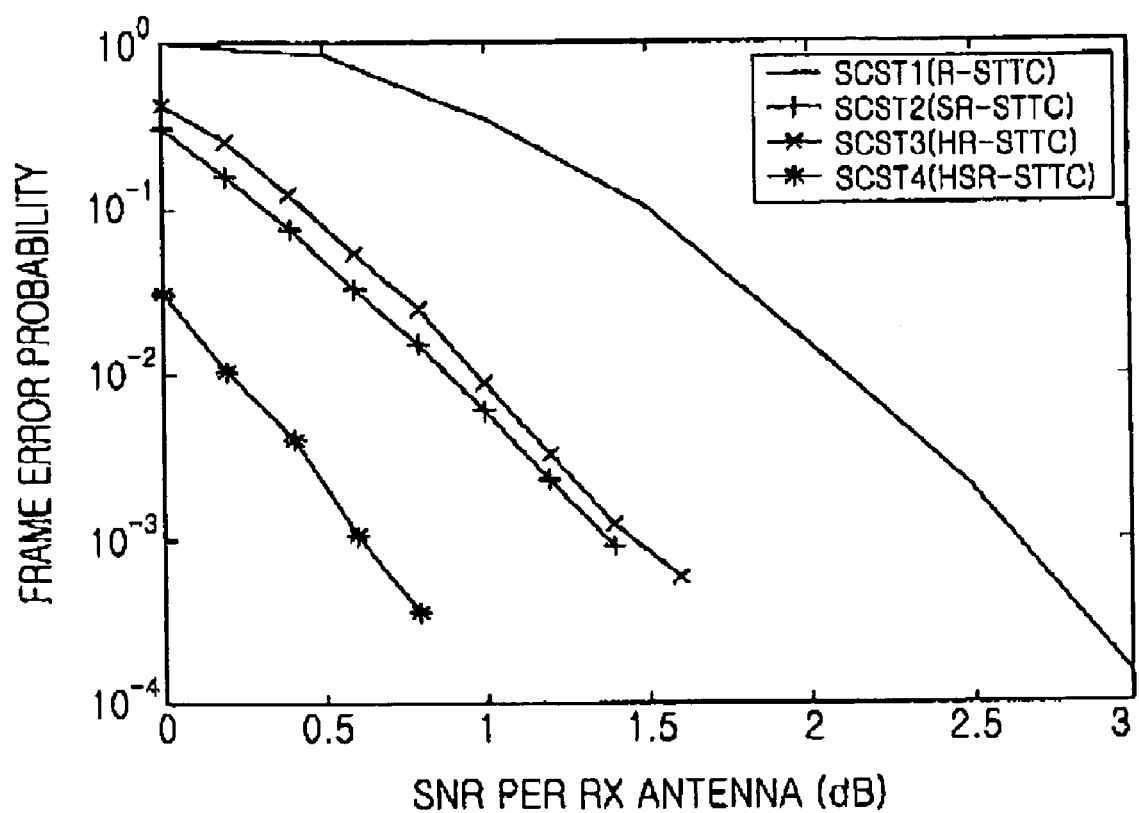
FIG. 7A is a graph illustrating a performance comparison in an independent fading channel model between embodiments of the present invention and the prior art.
Figure 7B:
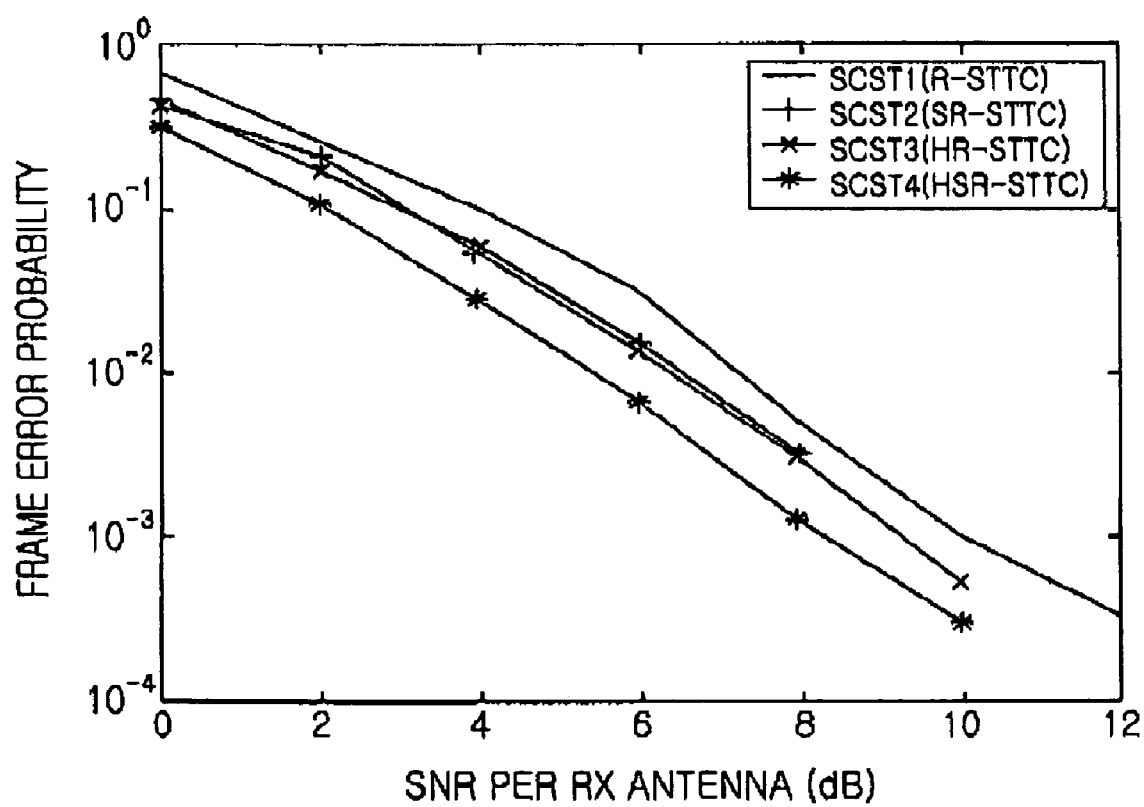
FIG. 7B is a graph illustrating a performance comparison in a quasi-static fading channel model between embodiments of the present invention and the prior art.
Figure 7C:
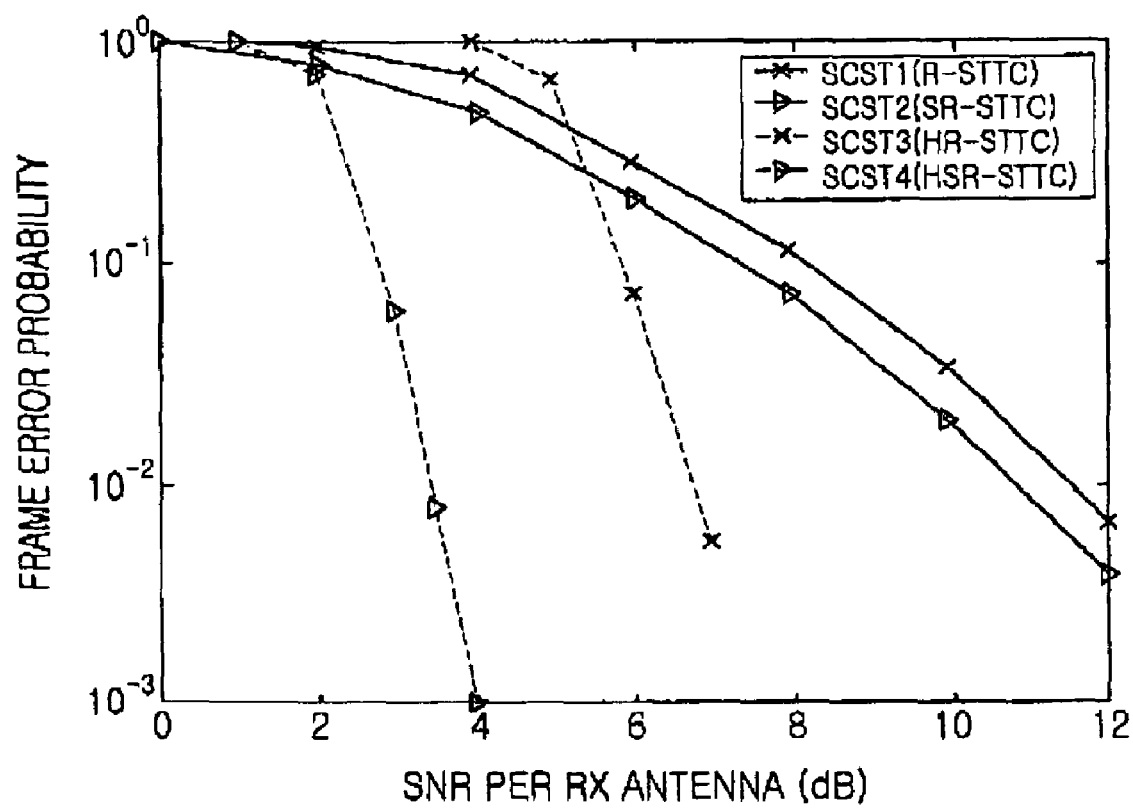
FIG. 7C is a graph illustrating a performance comparison in independent fading channel and quasi-static fading channel models between embodiments of the present invention and the prior art.

FIG. 7A is a graph illustrating a comparison of frame error probability in an independent fading channel model between embodiments of the present invention and the prior art, FIG. 7B is a graph illustrating a comparison of frame error probability in a quasi-static fading channel model between embodiments of the present invention and the prior art, and FIG. 7C is a graph illustrating a comparison of frame error probability in independent fading channel and quasi-static fading channel models between embodiments of the present invention and the prior art.

The followings are measurement conditions for the simulation.

inner encoder's code: R-STTC, SR-STTC, HR-STTC, HSR-STTC outer encoder's code: (1008, 3, 6) uniform LDPC (code rate: 0.5)

channel model: independent fading channel and quasi-static fading channel the number of antennas: 2 transmission antennas and 2 reception antennas decoding: 10-iteration LDPC decoding and 10-iteration LDPC-STTC decoding As illustrated in FIGS. 7A to 7C, it is noted that the SR-STTC, HR-STTC and HSR-STTC encoders according to embodiments of the present invention are generally superior to the conventional R-STTC encoder in performance. In particular, the HSR-STTC encoder according to the third embodiment of the present invention shows the most superior performance.

As stated above, the embodiments of the present invention have implemented high-performance STTC encoders by outputting output symbols of respective recursive convolutional encoders constituting the STTC encoders at different positions, and changing positions of transmission antennas.

Although the embodiments have proposed STTC encoders based on QPSK and 8PSK modulations, it is also possible to implement STTC encoders employing other modulation methods by changing the number of recursive convolutional encoders constituting the STTC encoders. For example, a 16QAM modulation-based STTC encoder can be implemented by parallel-concatenating 4 recursive convolutional encoders, and the STTC encoder can be implemented into the SR-STTC, HR-STTC or HSR-STTC encoder according to the embodiments of the present invention.

The present invention should not be limited to the foregoing embodiments, and various modifications of the embodiments can be made by forming the systematic convolutional encoders or implementing output symbols in a hybrid structure.

As can be appreciated from the foregoing description, the present invention increases a minimum distance of SC-STC by forming the SR-STTC encoder or HR-STTC encoder used as an inner encoder for the SC-STC, thereby reducing frame error probability, and contributing to performance improvement.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A space-time trellis code (STTC) encoding apparatus having an outer encoder for performing channel coding and an inner encoder for performing a space-time coding, in a mobile communication system including one or more transmission antennas, the apparatus comprising:

a first binary adder for adding a first input signal output from the outer encoder to a symbol output from the first input signal, for transmission via a first transmission antenna;

a first delay for delaying a signal output from the first binary adder and outputting the delayed signal to the first transmission antenna;

a second binary adder for adding a second input signal output from the outer encoder to a symbol output from the second input signal, for transmission via the first transmission antenna; and a second delay for delaying a signal output from the second binary adder and outputting the delayed signal to the first transmission antenna, wherein the first and second input signals are transmitted via a second transmission antenna.

2. The STTC encoding apparatus of claim 1, wherein symbols output from the first and second delays are transmitted via the first transmission antenna.

3. The STTC encoding apparatus of claim 1, wherein the apparatus is a systematic encoding apparatus wherein a signal equal to an input signal is included in an output signal before being transmitted.

4. The STTC encoding apparatus of claim 1, wherein an input/output function for the apparatus is expressed in a matrix G(D) defined as $$G(D) = (G_1, G_2)$$
$$= \begin{pmatrix} \frac{D}{(1+D)} & 0 & 1 & 0 \\ 0 & \frac{D}{(1+D)} & 0 & 1 \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through the first binary adder and the first delay, and a second row denotes a symbol output through the second binary adder and the second delay.

5. A space-time trellis code (STTC) encoding apparatus having an outer encoder for performing channel coding and an inner encoder for performing a space-time coding, in a mobile communication system including one or more transmission antennas, the apparatus comprising:
  a first binary adder for adding a first input signal output from the outer encoder to a symbol output from the first input signal, for transmission via a first transmission antenna, and outputting the result of the first binary adder to a second transmission antenna;
  a first delay for delaying a signal output from the first binary adder and outputting the delayed signal to the first transmission antenna;
  a second binary adder for adding a second input signal output from the outer encoder to a symbol output from the second input signal, for transmission via the second transmission antenna, and outputting the result of the second binary adder to the first transmission antenna; and
  a second delay for delaying a signal output from the second binary adder and outputting the delayed signal to the second transmission antenna.

6. The STTC encoding apparatus of claim 5, wherein symbols output from the first delay and the second binary adder are transmitted via the first transmission antenna.

7. The STTC encoding apparatus of claim 5, wherein symbols output from the second delay and the first binary adder are transmitted via the second transmission antenna.

8. The STTC encoding apparatus of claim 6, wherein the apparatus is a hybrid encoding apparatus wherein an encoded output symbol for the first input signal and an encoded output symbol for the second input signal are transmitted via different transmission antennas.

9. The STTC encoding apparatus of claim 5, wherein an input/output function for the apparatus is expressed in a matrix G(D) defined as $$G(D) = (G_1, G_2)$$
$$= \begin{pmatrix} 0 & \frac{D}{(1+D)} & \frac{1}{(1+D)} & 0 \\ \frac{1}{(1+D)} & 0 & 0 & \frac{D}{(1+D)} \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through the first binary adder and the first delay, and a second row denotes a symbol output through the second binary adder and the second delay.

10. A space-time trellis code (STTC) encoding apparatus having an outer encoder for performing channel coding, and an inner encoder for performing the space-time coding in a mobile communication system including one or more transmission antennas, the apparatus comprising:
  a first binary adder for adding a first input signal output from the outer encoder to a symbol output from the first input signal, for transmission via a first transmission antenna;
  a first delay for delaying a signal output from the first binary adder and outputting the delayed signal to the first transmission antenna;
  a second binary adder for adding a second input signal output from the outer encoder to a symbol output from the second input signal, for transmission via a second transmission antenna; and
  a second delay for delaying a signal output from the second binary adder and outputting the delayed signal to the second transmission antenna.

11. The STTC encoding apparatus of claim 10, wherein a symbol output from the first delayer and the second input signal are transmitted via the first transmission antenna.

12. The STTC encoding apparatus of claim 10, wherein a symbol output from the second delayer and the first input signal are transmitted via the second transmission antenna.

13. The STTC encoding apparatus of claim 10, wherein the apparatus is a systematic encoding apparatus wherein a signal equal to an input signal is included in an output signal before being transmitted.

14. The STTC encoding apparatus of claim 10, wherein the apparatus is a hybrid encoding apparatus wherein an encoded output symbol for the first input signal and an encoded output symbol for the second input signal are transmitted via different transmission antennas.

15. The STTC encoding apparatus of claim 11, wherein an input/output function for the apparatus is expressed in a matrix G(D) defined as $$G(D) = (G_1, G_2)$$
$$= \begin{pmatrix} 0 & \frac{D}{(1+D)} & 1 & 0 \\ 1 & 0 & 0 & \frac{D}{(1+D)} \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through the first binary adder and the first delay, and a second row denotes a symbol output through the second binary adder and the second delay.

16. A space-time trellis code (STTC) encoding apparatus having an outer encoder for performing channel coding and an inner encoder for performing the space-time coding, in a mobile communication system including one or more transmission antennas, the apparatus comprising:
   a first binary adder for adding a first input signal output from the outer encoder to a symbol output from the first input signal, for transmission via a first transmission antenna;
   a first delay for delaying a signal output from the first binary adder and outputting the delayed signal to the first transmission antenna;
   a second binary adder for adding a second input signal output from the outer encoder to a symbol output from the second input signal, for transmission via the first transmission antenna;
   a second delay for delaying a signal output from the second binary adder and outputting the delayed signal to the first transmission antenna;
   a third binary adder for adding a third input signal output from the outer encoder to a symbol output from the third input signal, for transmission via a second transmission antenna; and
   a third delay for delaying a signal output from the third binary adder and outputting the delayed signal to the second transmission antenna.

17. The STTC encoding apparatus of claim 16, wherein symbols output from the first and second delays and the third input signal are transmitted via the first transmission antenna.

18. The STTC encoding apparatus of claim 16, wherein a symbol output from the third delay and the first and second input signals are transmitted via the second transmission antenna.

19. The STTC encoding apparatus of claim 16, wherein the apparatus is a systematic encoding apparatus wherein a signal equal to an input signal is included in an output signal before being transmitted.

20. The STTC encoding apparatus of claim 16, wherein the apparatus is a hybrid encoding apparatus wherein encoded output symbols for the first and second input signals and an encoded output symbol for the third input signal are transmitted via different transmission antennas.

21. The STTC encoding apparatus of claim 16, wherein an input/output function for the apparatus is expressed in a matrix G(D) defined as $$G(D) = (G_1, G_2)$$

$$= \begin{pmatrix} \frac{D}{(1+D)} & 0 & 0 & 0 & 0 & 1 \\ 0 & \frac{D}{(1+D)} & 0 & 0 & 1 & 0 \\ 0 & 0 & 1 & \frac{D}{(1+D)} & 0 & 0 \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through the first binary adder and the first delay, a second row denotes a symbol output through the second binary adder and the second delay, and a third row denotes a symbol output through the third binary adder and the third delay.

22. A space-time trellis code (STTC) encoding method for performing space-time coding of a serially-concatenated space-time code (SC-STC) in an encoder having an outer encoder for performing channel coding and an inner encoder for performing the space-time coding, in a mobile communication system including one or more transmission antennas, the method comprising the steps of:
   transmitting via a first transmission antenna a symbol generated by encoding a first input signal output from the outer encoder by a first recursive convolutional encoder and a symbol generated by encoding a second input signal output from the outer encoder by a second recursive convolutional encoder; and
   transmitting via a second transmission antenna the first and second input signals.

23. The STTC encoding method of claim 22, wherein the encoding method is a systematic encoding method in which the same signal as an input signal is included in an output signal before being transmitted.

24. The STTC encoding method of claim 22, wherein an input/output function for the encoding method is expressed in a matrix G(D) defined as $$G(D) = (G_1, G_2)$$

$$= \begin{pmatrix} \frac{D}{(1+D)} & 0 & 1 & 0 \\ 0 & \frac{D}{(1+D)} & 0 & 1 \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through a first binary adder and a first delay, and a second row denotes a symbol output through a second binary adder and a second delay.

25. A space-time trellis code (STTC) encoding method for performing space-time coding of a serially-concatenated space-time code (SC-STC) in an encoder having an outer encoder for performing channel coding and an inner encoder for performing the space-time coding, in a mobile communication system including one or more transmission antennas, the method comprising the steps of:
   outputting to a first transmission antenna a symbol generated by encoding a first input signal output from the outer encoder by a first recursive convolutional encoder and a symbol output at a particular tap in a second recursive convolutional encoder for a second input signal output from the outer encoder; and
   outputting to a second transmission antenna a symbol generated by encoding the second input signal by the second recursive convolutional encoder and a symbol output at a particular tap in the first recursive convolutional encoder for the first input signal.

26. The STTC encoding method of claim 25, wherein the encoding method is a hybrid encoding method wherein an encoded output symbol for the first input signal and an encoded output symbol for the second input signal are transmitted via different transmission antennas.

27. The STTC encoding method of claim 25, wherein an input/output function for the encoding method is expressed in a matrix G(D) defined as $$G(D) = (G_1, G_2)$$

$$= \begin{pmatrix} 0 & \frac{D}{(1+D)} & \frac{1}{(1+D)} & 0 \\ \frac{1}{(1+D)} & 0 & 0 & \frac{D}{(1+D)} \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through a first binary adder and a first delay, and a second row denotes a symbol output through a second binary adder and a second delay.

28. A space-time trellis code (STTC) encoding method for performing space-time coding of a serially-concatenated space-time code (SC-STC) in an encoder having of an outer encoder for performing channel coding and an inner encoder for performing the space-time coding, in a mobile communication system including one or more transmission antennas, the method comprising the steps of:

outputting to a first transmission antenna a symbol generated by encoding a first input signal output from the outer encoder by a first recursive convolutional encoder and a second input signal output from the outer encoder; and outputting to a second transmission antenna a symbol generated by encoding the second input signal output from the outer encoder by a second recursive convolutional encoder and the first input signal.

29. The STTC encoding method of claim 28, wherein the encoding method is a systematic encoding method wherein a signal equal to an input signal is included in an output signal before being transmitted.

30. The STTC encoding method of claim 28, wherein the encoding method is a hybrid encoding method wherein an encoded output symbol for the first input signal and an encoded output symbol for the second input signal are transmitted via different transmission antennas.

31. The STTC encoding method of claim 28, wherein an input/output function for the encoding method is expressed in a matrix G(D) defined as $$G(D) = (G_1, G_2)$$
$$= \begin{pmatrix} 0 & \frac{D}{(1+D)} & 1 & 0 \\ 1 & 0 & 0 & \frac{D}{(1+D)} \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through a first binary adder and a first delay, and a second row denotes a symbol output through a second binary adder and a second delay.

32. A space-time trellis code (STTC) encoding method for performing space-time coding of a serially-concatenated space-time code (SC-STC) in an encoder having an outer encoder for performing channel coding and an inner encoder for performing the space-time coding, in a mobile communication system including one or more transmission antennas, the method comprising the steps of:

outputting to a first transmission antenna a symbol generated by encoding a first input signal output from the outer encoder by a first recursive convolutional encoder, a symbol generated by encoding a second input signal output from the outer encoder by a second recursive convolutional encoder and a third input signal output from the outer encoder; and outputting to a second transmission antenna a symbol generated by encoding the third input signal output from the outer encoder by a third recursive convolutional encoder and the first and second input signals.

33. The STTC encoding method of claim 32, wherein the encoding method is a systematic encoding method wherein a signal equal to an input signal is included in an output signal before being transmitted.

34. The STTC encoding method of claim 32, wherein the encoding method is a hybrid encoding method wherein encoded output symbols for the first and second input signals and an encoded output symbol for the third input signal are transmitted via different transmission antennas.

35. The STTC encoding method of claim 32, wherein an input/output function for the encoding method is expressed in a matrix G(D) defined as $$G(D) = (G_1, G_2)$$
$$= \begin{pmatrix} \frac{D}{(1+D)} & 0 & 0 & 0 & 0 & 1 \\ 0 & \frac{D}{(1+D)} & 0 & 0 & 1 & 0 \\ 0 & 0 & 1 & \frac{D}{(1+D)} & 0 & 0 \end{pmatrix}$$

where $G_1$ denotes a symbol transmitted via the first transmission antenna, $G_2$ denotes a symbol transmitted via the second transmission antenna, D denotes a delay, a first row of the G(D) denotes a symbol output through a first binary adder and a first delay, a second row denotes a symbol output through a second binary adder and a second delay, and a third row denotes a symbol output through a third binary adder and a third delay.

* * * * *